Patented Dec. 26, 1944

2,365,671

UNITED STATES PATENT OFFICE 2,365,671

PROTEIN-CONTAINING PLASTIC COMPOSITIONS AND PROCESS OF PRODUCING THE SAME

Lynn A. Watt, Webster Groves, Mo., assignor to Monsanto Chemical Company, St. Louis, Mo., a corporation of Delaware No Drawing. Application December 31, 1940, Serial No. 372,577

15 Claims. (Cl. 260—7)

This invention relates to new and improved protein-containing filling materials and, more particularly, to plastic compositions comprising these new materials.

It is an object of the present invention to provide new and improved filling materials for plastic compositions. It is a further object to provide molding compositions and articles prepared therefrom with greatly improved properties. Another object is to provide thermosetting molding compositions with increased flow. A further object is to prepare molded articles of decreased cost. Other objects will become apparent hereinafter.

According to the present invention, it has been found that materials obtainable by associating proteins or protein-containing materials with a metal hydroxide or, preferably, by treating the same with substantial quantities of a metal hydroxide according to the preferred process of this invention, may advantageously be employed, as hereinafter shown, as fillers in plastic compositions. More particularly, the fillers of the present invention are obtainable by treating protein-containing materials with metal hydroxides characterized by forming water-insoluble compositions with said protein materials. Such compositions when incorporated in thermosetting resins impart improved water resistance over that imparted by the untreated protein materials. Included within the scope of the present invention are compositions comprising these new fillers and such plastic materials as phenol-aldehyde resins, urea-aldehyde resins, vinyl resins, alkyd resins, cellulose derivatives and the like.

It is well-known that proteins are found in many materials of various types, and, for purposes of illustration, the following sources of proteins may be mentioned: cocoa beans, soya beans, milk, egg white, blood, flax seeds, corn, wheat, rye, malt, fruit kernels, hemp and cotton seed hulls, as well as various other vegetable and animal products. It is, of course, understood that the proteins or protein-containing materials can be subjected to purification and/or other treatment before they are employed in the process of the present invention. The exact pre-treatment of the protein materials will depend, for example, on their nature and the particular properties desired in any plastic compositions in which they are to be incorporated. Thus, for example, cocoa beans are preferably substantially freed from oils and fats by expressing and/or extracting with a suitable solvent the oils and fats present in the beans before said beans are employed in the process of the present invention.

The association or treatment of the suitably prepared protein material with a metal hydroxide can be accomplished in various ways. Thus, if desired, the protein material, preferably in a powdered condition, can be simply intimately mixed with a substantial amount of a suitable powdered metal hydroxide. However, according to the preferred process of this invention, the protein material is heated for a period of time in, for example, a water suspension of the metal hydroxide whereby it is believed that chemical combination takes place between the metal hydroxide and the protein material. Then, the metal hydroxide-protein material mix is freed from the water in a suitable manner, as for example, by drying. The amount of metal hydroxide incorporated in the protein material may be widely varied. Preferably, when employing a metallic hydroxide of the present invention, as for example, calcium hydroxide, it has been found desirable to employ an amount of hydrated lime equal to at least 50% of the weight of the protein content of the protein material. Improved results have been obtained with protein materials treated with hydrated lime amounting to as much as three times their protein content.

The following specific examples are illustrative of the new and useful improvements obtained by employing metal hydroxide-treated proteins of the present invention as filling materials in plastic compositions. These examples are presented for purposes of illustration only and are not to be construed as limitative of the invention. The parts are by weight in these examples.

The phenol formaldehyde resin employed in each of these examples was a typical two stage molding resin after the incorporation of hexamethylenetetramine. The cure times given in these examples represent the minimum molding periods necessary to prevent blistering when the material is molded in a cup-shaped mold at 160° C. and 2000 pounds per square inch pressure. The flow values were determined on an Olsen-Bakelite flow tester at 150° C. and 700 pounds per square inch pressure except where otherwise indicated. The water absorption values represent the increase in weight of a molded disc ⅛ inch in thickness and 2 inches in diameter after 48 hours exposure to water at 25° C. The test samples were then allowed to dry and their surface condition noted. Shrinkages were determined by comparing the length of a molded bar 5 inches long with a ½ inch square cross-section, with the length of the mold in which the bar had been formed, both measured at 70° F. The shrinkage values are expressed as inches shrinkage per linear inch. The soya bean material employed in these examples was an oil-free soya bean material sold on the market as "Prosoy G" and is reported to contain 30–35% protein. The cocoa bean material used in the following examples was substantially oil and fat-free and suitably pulverized and contained 27.5% protein based on its nitrogen content.

Example 1

| | Parts |
|---|---|
| Phenol formaldehyde resin | 47.5 |
| Wood flour | 17.5 |
| Burnt umber | 5.0 |
| Zinc stearate | 1.0 |
| 20.2 parts of soya bean material mixed with 9.8 parts of hydrated lime | 30.0 |

The above ingredients were mixed on differential mixing rolls for substantially 2 minutes at a front roll temperature of substantially 210° F. and a back roll temperature of substantially 290° F. The molding composition thus produced had a cure time of 37 seconds and flow of 0.63 inch. Articles molded from this material gave a water absorption value of 0.73%, showed a shrinkage of 0.0052 inch per linear inch, were relatively rigid at the molding temperature and had a good surface finish which was slightly impaired as a result of the exposure to water during the water absorption determination.

Example 2

In this example are given a series of molding compositions showing the improvements effected as the proportion of metal hydroxide to protein is increased. Batch 1 is a typical prior protein-containing molding composition.

| | Batch No. | | | | |
|---|---|---|---|---|---|
| | 1 | 2 | 3 | 4 | 5 |
| Phenol formaldehyde resin | 47.5 | 47.5 | 47.5 | 47.5 | 47.5 |
| Wood flour | 17.5 | 17.5 | 17.5 | 17.5 | 17.5 |
| Soya bean material | 30.0 | 28.6 | 26.1 | 22.75 | 17.55 |
| Hydrated lime | | 1.4 | 3.9 | 7.25 | 12.45 |
| Burnt umber | 5.0 | 5.0 | 5.0 | 5.0 | 5.0 |
| Zinc stearate | 1.0 | 1.0 | 1.0 | 1.0 | 1.0 |
| Lime-protein ratio | 0.00 | 0.14 | 0.45 | 0.91 | 2.03 |

The ingredients in each of the above batches were mixed on differential mixing rolls for substantially 2 minutes at a front roll temperature of substantially 210° F. and a back roll temperature of substantially 290° F. The soya bean material had previously been treated with the lime in the following manner. A partial solution and uniform suspension of hydrated lime (calcium hydroxide) was prepared by rapid agitation of the hydrated lime with substantially 120 parts of cold water. The soya bean material, previously substantially freed from oils and in a relatively finely divided state, was then added with vigorous agitation to the lime-water suspension. The slurry, thus formed, was then heated to substantially 90° C. and held at that temperature for one to two hours. During this heating period, the slurry which initially was relatively fluid increased in viscosity and darkened somewhat. The water was then dried from the reacted mix in a suitable manner, as for example, by means of a drum drier, a vacuum oven or the like.

The molding compositions produced in this example had the following properties:

| | Batch No. | | | | |
|---|---|---|---|---|---|
| | 1 | 2 | 3 | 4 | 5 |
| Cure in seconds | 40 | 40 | 37 | 35 | 30 |
| Flow | 0.67 | 0.54 | 0.48 | 0.55 | 0.52 |

Articles molded from these compositions showed the following properties:

| | Batch No. | | | | |
|---|---|---|---|---|---|
| | 1 | 2 | 3 | 4 | 5 |
| Rigidity at the molding temperature | Rubbery | Rubbery | Relatively rigid | Relatively rigid | Relatively rigid. |
| Surface finish | Good | Good | Good | Good | Good. |
| Water absorption value, per cent | 1.34 | 1.18 | 0.71 | 0.49 | 0.35. |
| Surface finish after water absorption determination | Poor | Poor | Fair | Fairly good | Good |
| Shrinkage in inches, per linear inch | 0.0084 | 0.0084 | 0.0079 | 0.0077 | 0.0058. |

From the foregoing example it can be seen that as the ratio of metal hydroxide, for example, calcium hydroxide, to protein in the soya bean material is increased, the defects ordinarily encountered, in the use of soya bean fillers in conjunction with molding compositions, as for example, in phenol formaldehyde molding compositions, are overcome. Especially noteworthy are the increased water resistance, decreased shrinkage, and lack of rubberiness at their molding temperature of articles molded from compositions that contain the protein material treated with metal hydroxide according to this invention.

Furthermore, it can be seen by comparison with the product of Example 1 that the use as a filler of protein material treated with lime according to the preferred process of this invention resulted in improved water resistance in the molded article.

For further comparison with prior molding compositions and articles produced therefrom a molding composition similar to those given in Example 2 was prepared in which the filler consisted in 47.5 parts of wood flour. This molding composition had a cure time of 37 seconds but a flow of only 0.37 inch and, thus, was greatly inferior to the molding compositions of the present invention.

Example 3

| | Parts |
|---|---|
| Phenol formaldehyde resin | 47.5 |
| Wood flour | 17.5 |
| Burnt umber | 5.0 |
| Zinc stearate | 1.0 |
| 24.0 parts of cocoa bean material treated with 6.0 parts hydrated lime according to the process employed in Example 2 | 30.0 |

The above ingredients were mixed on differential mixing rolls for substantially 2 minutes at a front roll temperature of substantially 210° F. and a back roll temperature of substantially 290° F. The molding composition thus produced had a cure time of 35 seconds and a flow of 0.59 inch. Articles molded from this material gave a water absorption value of 0.53%, were relatively rigid at the molding temperature, had an excellent surface finish that was not impaired by the exposure to water during the water absorption determination and showed a shrinkage of 0.0069 inch per linear inch.

Example 4

| | Parts |
|---|---|
| Phenol formaldehyde resin | 47.5 |
| Wood flour | 17.5 |
| Burnt umber | 5.0 |
| Zinc stearate | 2.0 |
| 20.8 parts of cocoa bean material treated with 9.2 parts hydrated lime as in Example 2 | 30.0 |

The above ingredients were mixed for substantially 1 minute on differential mixing rolls at a front roll temperature of substantially 210° F. and a back roll temperature of substantially 290° F. The molding composition so produced had a cure time of 35 seconds and a flow of 1.48 inches. Articles molded from this material gave a water absorption value of 0.38% were relatively rigid at the molding temperature, showed a shrinkage of 0.0062 inch per linear inch and had a good surface finish which was not impaired by the exposure to water during the water absorption determination.

The foregoing Examples 3 and 4 illustrate the useful and unforeseen results obtained by the use of cocoa bean material treated with a metal hydroxide according to the preferred process of this invention. Particularly outstanding is the extremely high flow value of the product in Example 4 without impairment of the other valuable properties. A molding composition similar to that in Example 4 except that the hydrated lime-treated cocoa bean material was replaced by an equal amount of wood flour, had a flow of only 0.50 inch. High flow values such as are exhibited by the products in Example 4 are particularly desirable in the molding of large articles such as radio cabinets. Heretofore, it has been necessary to increase the resin content of a phenolic resin molding compound in order to obtain such high flow values. This is very undesirable since the resin component is by far the most expensive component in these compositions. Conversely in the molding of articles requiring normal flow, the use of metal hydroxide-treated protein material as at least a portion of the filler makes possible a reduction in the proportion of the relatively expensive resin component over that employed with prior fillers. Such compositions are illustrated by the products in the following Examples 5 and 6.

Example 5

| | Parts |
|---|---|
| Phenol formaldehyde resin | 42.5 |
| Wood flour | 32.5 |
| Burnt umber | 5.0 |
| 16.0 parts of cocoa bean material treated with 4.0 parts hydrated lime according to the process employed in Example 2 | 20.0 |

The above ingredients were mixed for substantially 1 minute on differential mixing rolls at a front roll temperature of substantially 200° F. and a back roll temperature of substantially 290° F. The molding composition, thus produced, had a cure time of 40 seconds and a flow of 0.50 inch. Articles molded from this material gave a water absorbtion value of 0.55%, were relatively rigid at the molding temperature, had a good surface finish which was not impaired by the exposure to water during the water absorption determination and showed a shrinkage of 0.0079 inch per linear inch.

The product in the foregoing example in comparison with typical wood flour filled molding compositions previously described, shows that by employing the hydrated lime-treated cocoa bean material of the present invention in partial replacement of wood flour as a filler, the resin content and therefore the cost of phenol formaldehyde molding powders and the products obtained therefrom can be reduced without impairment of the quality of the molding composition or the molded product obtained therefrom.

Example 6

| | Parts |
|---|---|
| Phenol formaldehyde resin | 37.5 |
| Burnt umber | 5.0 |
| 18.8 parts of cocoa bean material treated with 4.7 parts hydrated lime according to the process employed in Example 2 | 23.5 |
| Cocoanut shell filler | 23.5 |

The above ingredients were mixed on differential mixing rolls for substantially 1 minute at a front roll temperature of substantially 210° F. and back roll temperature of substantially 290° F. The molding composition so produced had a cure time of 30 seconds and a flow of 1.18 inches at 150° C. and 500 pounds per square inch pressure. Articles molded from this material gave a water absorption value of 0.36%, had a good surface finish after the exposure to water during the water absorption determination and showed a shrinkage of 0.0082 inch per linear inch.

The foregoing example is a further illustration of the valuable results obtained by employing metal hydroxide-treated protein material as at least a portion of the filler in a phenol formaldehyde molding composition.

Among other examples of the present invention illustrating the use of protein material treated with metal hydroxides are the following:

Example 7

| | Parts |
|---|---|
| Phenol formaldehyde resin | 47.5 |
| 20.2 parts of soya bean material treated with 9.8 parts of hydrated magnesium oxide ($MgO.H_2O$) according to the process employed for hydrated lime in Example 2 | 30.0 |
| Wood flour | 17.5 |
| Burnt umber | 5.0 |
| Zinc stearate | 1.0 |

The above ingredients were mixed on differential mixing rolls for substantially 2 minutes at a front roll temperature of substantially 210° F. and a back roll temperature of substantially 290° F. The molding composition thus produced had a cure time of 27 seconds and a flow of 0.63 inch. Articles molded from this material gave a water absorption value of 4.38%, showed a shrinkage of 0.0065 inch per linear inch, were relatively rigid at the molding temperature and the surface finish of the molded article was not impaired by the exposure to water during the water absorption determination.

Example 8

| | Parts |
|---|---|
| Phenol formaldehyde resin | 47.5 |
| Wood flour | 17.5 |
| 20.4 parts of soya bean material treated with 9.6 parts of hydrated aluminum oxide ($Al_2O_3.2H_2O$) according to the process employed for hydrated lime in Example 2 | 30.0 |
| Burnt umber | 5.0 |
| Zinc stearate | 1.0 |

The above ingredients were mixed on differential mixing rolls for substantially 2 minutes at a front roll temperature of substantially 210° F. and a back roll temperature of substantially 290° F. The molding composition so produced had a cure time of 35 seconds and a flow of 0.76 inch. Articles molded from this material give a water absorption value of 0.78%, showed a shrinkage of 0.0087 inch per linear inch and were relatively rigid at the molding temperature.

*Example 9*

|   | Parts |
|---|---|
| Phenol formaldehyde resin | 47.5 |
| 20.2 parts of soya bean material treated with 9.8 parts of ferric hydroxide according to the process employed for hydrated lime in Example 2 | 30.0 |
| Wood flour | 17.5 |
| Burnt umber | 5.0 |
| Zinc stearate | 1.0 |

The above ingredients were mixed on differential mixing rolls for substantially 2 minutes at a front roll temperature of substantially 210° F. and a back roll temperature of substantially 290° F. The molding composition thus produced had a cure time of 35 seconds and a flow of 0.72 inch. Articles molded from this material gave a water absorption value of 0.60%, showed a shrinkage of 0.0073 inch per linear inch, were relatively rigid at the molding temperature and the surface finish of the molded article was not impaired by the exposure to water during the water absorption determination.

*Example 10*

|   | Parts |
|---|---|
| Phenol formaldehyde resin | 47.5 |
| 20.2 parts of soya bean material treated with 9.8 parts of ortho silicic acid (Si(OH)4) according to the process employed for hydrated lime in Example 2 | 30.0 |
| Wood flour | 17.5 |
| Burnt umber | 5.0 |
| Zinc stearate | 1.0 |

The above ingredients were mixed on differential mixing rolls for substantially 2 minutes at a front roll temperature of substantially 210° F. and a back roll temperature of substantially 290° F. The molding composition thus produced had a cure time of 30 seconds and a flow of 0.65 inch. Articles molded from this material gave a water absorption value of 0.65%, showed a shrinkage of 0.0082 inch per linear inch, were relatively rigid at the molding temperature and the surface finish of the molded article was not impaired by the exposure to water during the water absorption determination.

*Example 11*

|   | Parts |
|---|---|
| Phenol formaldehyde resin | 47.5 |
| 20.0 parts of chrome tanned leather scrap treated with 10.0 parts of calcium hydroxide according to the process employed for treating soya bean material with hydrated lime in Example 2 | 30.0 |
| Wood flour | 17.5 |
| Burnt umber | 5.0 |
| Zinc stearate | 1.0 |

The above ingredients were mixed on differential mixing rolls for substantially 1 minute at a front roll temperature of substantially 210° F. and a back roll temperature of substantially 290° F. The molding composition thus produced had a cure time of 60 seconds and a flow of 0.71 inch. Articles molded from this material gave a water absorption value of 0.79%, showed a shrinkage of 0.0064 inch per linear inch, were relatively rigid at the molding temperature and the surface finish of the molded article was not impaired by the exposure to water during the water absorption determination.

*Example 12*

|   | Parts |
|---|---|
| Phenol formaldehyde resin | 47.5 |
| Untreated casein | 15.0 |
| Wood flour | 32.5 |
| Burnt umber | 5.0 |

The above ingredients were mixed on differential mixing rolls for substantially 2 minutes at a front roll temperature of substantially 210° F. and a back roll temperature of substantially 290° F. The molding composition thus produced had a cure time of 35 seconds and a flow of 0.52 inch. Articles molded from this material gave a water absorption value of 1.07%, showed a shrinkage of 0.0054 inch per linear inch, were very rubbery at the molding temperature and the surface finish of the molded article was greatly impaired by the exposure to water during the water absorption determination.

In comparison with the product of the foregoing example in which untreated casein was employed as a portion of the filler, the product of the following example illustrates the improvements effected in a phenol formaldehyde molding composition by the use of casein treated with hydrated lime according to the preferred process of this invention.

*Example 13*

|   | Parts |
|---|---|
| Phenol formaldehyde resin | 47.5 |
| 15.0 parts of casein treated with 15.0 parts of calcium hydroxide according to the process in Example 2 | 30 |
| Wood flour | 17.5 |
| Burnt umber | 5.0 |

The above ingredients were mixed on differential mixing rolls for substantially 2 minutes at a front roll temperature of substantially 210° F. and a back roll temperature of substantially 290° F. The molding composition thus produced had a cure time of 33 seconds and a flow of 0.48 inch. Articles molded from this material gave a water absorption value of 0.28%, showed a shrinkage of 0.0049 inch per linear inch, were relatively rigid at the molding temperature and the surface finish of the molded article was not impaired by the exposure to water during the water absorption determination.

While the foregoing specific examples illustrate the improvements imparted to plastic materials by the use of the new fillers of the present invention, the present invention is not limited to these illustrative embodiments of the invention. There are numerous variables that may be introduced without departing from the essence of this invention. Thus, for example, while the examples show protein materials mixed with wood flour or other filling material to make up the total filler, improved products are obtained with the filler consisting entirely of metal hydroxide-treated protein material. Such a material is shown in the following example.

Example 14

| | Parts |
|---|---|
| Phenol formaldehyde resin | 47.5 |
| 38.0 parts of cocoa bean material treated with 9.5 parts of hydrated lime according to the process employed in Example 2 | 47.5 |
| Burnt umber | 5.0 |
| Zinc stearate | 1.0 |

The above ingredients were mixed on differential mixing rolls for substantially 2 minutes at a front roll temperature of substantially 230° F. and a back roll temperature of substantially 325° F. The molding composition thus produced had a cure time of 40 seconds and a flow of 1.50 inches. Articles molded from this material gave a water absorption value of 0.32%, showed a shrinkage of 0.0069 inch per linear inch, were relatively rigid at the molding temperature and had a good surface finish which was not impaired by the exposure to water during the water absorption determination.

Another protein-containing material that has shown increased value as a filler after treatment with a metal hydroxide according to this invention, comprises cotton seed hulls. Thus, a composition comprising 47.5 parts of a two-stage phenol formaldehyde molding resin, 47.5 parts of a filler consisting of 35.7 parts of cotton seed hull material treated as in Example 2 with 11.8 parts of hydrated lime and 5 parts of burnt umber showed a cure time of 35 seconds and a flow of 0.60 inch. A molded article prepared from this material showed a water absorption of only 0.42% and a shrinkage of only 0.0050 inch per linear inch.

While the specific examples show the use of the new fillers of the present invention in phenol formaldehyde molding resins, as previously indicated, the present invention is applicable to plastic materials broadly and the fillers of the present invention are employable in conjunction with any suitable plastic material.

It is obvious that the method of incorporating metal hydroxides with protein material by treatment in suspension in an aqueous medium can likewise be subjected to alteration. Thus, while the method previously given is preferred there obviously are numerous variations of this treatment that may be employed without departing from the essence of this invention.

This invention is limited solely by the claims attached hereto.

What is claimed is:

1. A new composition of matter comprising a thermo-setting synthetic resin which is a condensation product of an aldehyde and a substance selected from the group consisting of phenol and urea, and a modified protein substance comprising the reaction product of a protein-containing material and from 50% to 300%, by weight of the protein content of the protein-containing material, of a polyvalent metal hydroxide.

2. A molding composition comprising a thermo-setting phenol-aldehyde resin and a modified protein substance comprising the reaction product of a protein-containing material and from 50% to 300%, by weight of the protein content of the protein-containing material, of a polyvalent metal hydroxide.

3. A new composition of matter comprising a thermo-setting phenol-formaldehyde resin, a filler and a modified protein substance comprising the reaction product of a protein-containing material and from 50% to 300%, by weight of the protein content of the protein-containing material, of a polyvalent metal hydroxide.

4. A molding composition comprising a minor proportion of a thermo-setting phenol-formaldehyde resin and a major proportion of a filler at least a substantial amount of which is a modified protein substance comprising the reaction product of a protein-containing material and from 50% to 300%, by weight of the protein content of the protein-containing material, of a polyvalent metal hydroxide.

5. A molding composition characterized by high flow, low shrinkage and low water absorption characteristics comprising a thermo-setting phenol-formaldehyde resin and a modified protein substance comprising the reaction product of a protein-containing soya bean material and from 50% to 300%, by weight of the protein content of the soya bean material, of a polyvalent metal hydroxide.

6. A new composition of matter comprising a thermo-setting phenol-aldehyde resin, a filler and a modified protein substance comprising the reaction product of a protein-containing cocoa bean material and from 50% to 300%, by weight of the protein content of the cocoa bean material, of a polyvalent metal hydroxide.

7. A new composition of matter comprising a thermo-setting phenol-aldehyde resin and a modified protein substance comprising the reaction product of a protein-containing cocoa bean material and from 50% to 300%, by weight of the protein content of the cocoa bean material, of a polyvalent metal hydroxide.

8. A new composition of matter comprising a thermo-setting phenol-formaldehyde resin and a modified protein substance comprising the reaction product of a protein-containing cocoa bean material and from 50% to 300%, by weight of the protein content of the cocoa bean material, of hydrated lime.

9. A molding composition comprising a thermo-setting phenol-formaldehyde resin and a modified protein substance comprising the reaction product of an oil and fat-free protein-containing cocoa bean material and from 50% to 300%, by weight of the protein content of the cocoa bean material, of hydrated lime, said modified protein substance being prepared by heating said cocoa bean material and said lime in an aqueous medium and then drying the reaction product.

10. A thermo-setting phenol-aldehyde molding composition characterized by high flow, low shrinkage and low water absorption characteristics comprising a preformed phenol-aldehyde resin and a wood-flour filler and wherein a part of said wood-flour filler has been replaced by a modified protein substance comprising the reaction product of a cocoa bean material and from 50% to 300%, by weight of the protein content of the cocoa bean material, of a polyvalent metal hydroxide.

11. A molding composition comprising a minor proportion of thermo-setting phenol-formaldehyde resin and a major proportion of a filler at least a substantial amount of which is a modified protein substance comprising the reaction product of an oil and fat-free protein-containing cocoa bean material and from 50% to 300%, by weight of the protein content of the cocoa bean material, of a polyvalent metal hydroxide.

12. A process for preparing molded articles comprising mixing a thermo-setting phenol-aldehyde resin, and a modified protein substance comprising the reaction product of a protein-containing material and from 50% to 300%, by weight of the protein content of the protein-containing material, of a polyvalent metal hydroxide, and molding the resulting composition.

13. A process of preparing a molded article comprising mixing a protein-containing material with from 50% to 300%, by weight of the protein content of the protein-containing material, of a polyvalent metal hydroxide dispersed in water, heating the mixture to about 90° C., thereafter drying the reaction product, adding a thermo-setting phenol-formaldehyde resin and molding the resulting composition under heat and pressure.

14. A molded article prepared as described in claim 12.

15. A molded article prepared as described in claim 13.

LYNN A. WATT.

---

CERTIFICATE OF CORRECTION.

Patent No. 2,365,671.   December 26, 1944.

LYNN A. WATT.

It is hereby certified that error appears in the printed specification of the above numbered patent requiring correction as follows: Page 3, second column, line 58, Example 7, for "4.38%" read --0.38%--; and that the said Letters Patent should be read with this correction therein that the same may conform to the record of the case in the Patent Office.

Signed and sealed this 20th day of March, A. D. 1945.

Leslie Frazer

Acting Commissioner of Patents.

(Seal)

prising the reaction product of a protein-containing material and from 50% to 300%, by weight of the protein content of the protein-containing material, of a polyvalent metal hydroxide, and molding the resulting composition.

13. A process of preparing a molded article comprising mixing a protein-containing material with from 50% to 300%, by weight of the protein content of the protein-containing material, of a polyvalent metal hydroxide dispersed in water, heating the mixture to about 90° C., thereafter drying the reaction product, adding a thermo-setting phenol-formaldehyde resin and molding the resulting composition under heat and pressure.

14. A molded article prepared as described in claim 12.

15. A molded article prepared as described in claim 13.

LYNN A. WATT.

---

CERTIFICATE OF CORRECTION.

Patent No. 2,365,671.  December 26, 1944.

LYNN A. WATT.

It is hereby certified that error appears in the printed specification of the above numbered patent requiring correction as follows: Page 3, second column, line 58, Example 7, for "4.38%" read --0.38%--; and that the said Letters Patent should be read with this correction therein that the same may conform to the record of the case in the Patent Office.

Signed and sealed this 20th day of March, A. D. 1945.

Leslie Frazer

Acting Commissioner of Patents.

(Seal)